(12) United States Patent
Brown et al.

(10) Patent No.: US 10,135,776 B1
(45) Date of Patent: Nov. 20, 2018

(54) CROSS PLATFORM SOCIAL NETWORKING MESSAGING SYSTEM

(75) Inventors: Nathan Brown, San Francisco, CA (US); Henry Joseph Sommer, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 785 days.

(21) Appl. No.: 13/077,425

(22) Filed: Mar. 31, 2011

(51) Int. Cl.
| H04L 12/24 | (2006.01) |
| H04L 12/58 | (2006.01) |
| H04L 29/06 | (2006.01) |
| G06Q 50/00 | (2012.01) |

(52) U.S. Cl.
CPC .......... *H04L 51/32* (2013.01); *G06Q 50/01* (2013.01); *H04L 41/022* (2013.01); *H04L 41/28* (2013.01); *H04L 51/00* (2013.01); *H04L 63/08* (2013.01); *H04L 65/40* (2013.01)

(58) Field of Classification Search
CPC combination set(s) only.
See application file for complete search history.

(56) References Cited

U.S. PATENT DOCUMENTS

| 6,769,068 | B1 | 7/2004 | Brozowski et al. |
| 7,370,335 | B1 | 5/2008 | White et al. |
| 7,565,494 | B1 | 7/2009 | Todd et al. |
| 7,657,652 | B1 | 2/2010 | Balaji |
| 7,673,327 | B1 | 3/2010 | Polis et al. |
| 7,769,395 | B2* | 8/2010 | Fiatal et al. ............... 455/456.3 |
| 7,801,971 | B1 | 9/2010 | Amidon et al. |
| 7,827,208 | B2 | 11/2010 | Bosworth et al. |
| 7,974,983 | B2 | 7/2011 | Goeldi |
| 8,078,741 | B2 | 12/2011 | Barnfield et al. |
| 8,086,253 | B1* | 12/2011 | Kalamkar et al. ............ 455/466 |
| 8,170,189 | B2* | 5/2012 | Alperin ............ H04M 3/42263 370/352 |
| 8,171,114 | B1 | 5/2012 | Dale et al. |
| 8,176,124 | B2* | 5/2012 | Graham ............... A63F 13/12 463/42 |

(Continued)

OTHER PUBLICATIONS

"U.S. Appl. No. 13/077,411, Response filed May 1, 2013 to Non Final Office Action dated Dec. 6, 2012", 16 pgs.

(Continued)

*Primary Examiner* — Patrice L Winder
*Assistant Examiner* — Angela M Widhalm De Rodriguez
(74) *Attorney, Agent, or Firm* — Schwegman Lundberg & Woessner, P.A.

(57) ABSTRACT

Disclosed is a method of cross-social network communication. The method may include determining a plurality of recipients of a social networking service interaction, determining a plurality of target social networking services based upon the plurality of recipients of the social networking service interaction, and a plurality of authentication information associated with the plurality of social networking services. The method may include constructing an application programming interface call for each of the plurality of target social networking services, the application programming interface call associated with the social networking service interaction, the application programming interface call specifying one or more of the plurality of recipients that is to receive the interaction, the one or more of the plurality of recipients being members of the particular target social networking service.

20 Claims, 11 Drawing Sheets

(56) References Cited

U.S. PATENT DOCUMENTS

| | | | |
|---|---|---|---|
| 8,276,190 B1 | 9/2012 | Chang et al. | |
| 8,296,784 B1 | 10/2012 | Brown et al. | |
| 8,311,531 B2* | 11/2012 | Haaparanta et al. | 455/418 |
| 8,332,488 B1 | 12/2012 | Dale et al. | |
| 8,347,322 B1 | 1/2013 | Brown et al. | |
| 8,352,969 B2 | 1/2013 | Brown et al. | |
| 8,352,970 B2 | 1/2013 | Brown et al. | |
| 8,386,250 B2* | 2/2013 | Lloyd et al. | 704/244 |
| 8,429,277 B2 | 4/2013 | Dale et al. | |
| 8,438,231 B2 | 5/2013 | Cai et al. | |
| 8,453,218 B2* | 5/2013 | Lan et al. | 726/4 |
| 8,522,137 B1 | 8/2013 | Brown et al. | |
| 8,549,073 B2 | 10/2013 | Dale et al. | |
| 8,700,735 B1 | 4/2014 | Dale et al. | |
| 8,745,134 B1 | 6/2014 | Dale et al. | |
| 8,984,541 B1 | 3/2015 | Brown et al. | |
| 9,003,505 B2 | 4/2015 | Brown et al. | |
| 9,210,201 B2 | 12/2015 | Dale et al. | |
| 2002/0065899 A1 | 5/2002 | Smith et al. | |
| 2003/0018670 A1 | 1/2003 | Ashford et al. | |
| 2004/0268231 A1 | 12/2004 | Tunning | |
| 2005/0193332 A1* | 9/2005 | Dodrill et al. | 715/513 |
| 2005/0216550 A1 | 9/2005 | Paseman et al. | |
| 2006/0143303 A1 | 6/2006 | Serenyi et al. | |
| 2006/0265689 A1 | 11/2006 | Kuznetsov et al. | |
| 2007/0150603 A1 | 6/2007 | Crull et al. | |
| 2007/0300258 A1* | 12/2007 | O'Connor et al. | 725/44 |
| 2008/0182563 A1 | 7/2008 | Wugofski et al. | |
| 2009/0016504 A1* | 1/2009 | Mantell et al. | 379/101.01 |
| 2009/0049525 A1 | 2/2009 | D'Angelo et al. | |
| 2009/0187865 A1 | 7/2009 | Brownholtz et al. | |
| 2009/0199275 A1 | 8/2009 | Brock et al. | |
| 2009/0292814 A1 | 11/2009 | Ting et al. | |
| 2009/0307332 A1 | 12/2009 | Litwin | |
| 2010/0010866 A1* | 1/2010 | Bal et al. | 705/10 |
| 2010/0077045 A1* | 3/2010 | Bercu et al. | 709/206 |
| 2010/0100952 A1 | 4/2010 | Sample et al. | |
| 2010/0114788 A1* | 5/2010 | White et al. | 705/319 |
| 2010/0144788 A1 | 6/2010 | Stensbol et al. | |
| 2010/0199340 A1* | 8/2010 | Jonas et al. | 726/8 |
| 2010/0217869 A1 | 8/2010 | Esteban et al. | |
| 2010/0223341 A1* | 9/2010 | Manolescu et al. | 709/206 |
| 2010/0235578 A1 | 9/2010 | Sih et al. | |
| 2010/0274815 A1 | 10/2010 | Vanasco | |
| 2010/0281216 A1 | 11/2010 | Patel et al. | |
| 2010/0306099 A1 | 12/2010 | Hirson et al. | |
| 2011/0022580 A1* | 1/2011 | Badulescu et al. | 707/712 |
| 2011/0023101 A1 | 1/2011 | Vernal et al. | |
| 2011/0040844 A1 | 2/2011 | Lawler et al. | |
| 2011/0047182 A1 | 2/2011 | Shepherd et al. | |
| 2011/0055333 A1 | 3/2011 | Guy et al. | |
| 2011/0113073 A1 | 5/2011 | Chang | |
| 2011/0113094 A1 | 5/2011 | Chunilal | |
| 2011/0145270 A1* | 6/2011 | Christopher et al. | 707/769 |
| 2011/0145512 A1 | 6/2011 | Adl-tabatabai et al. | |
| 2011/0153759 A1 | 6/2011 | Rathod | |
| 2011/0154445 A1 | 6/2011 | Schmidt-Karaca et al. | |
| 2011/0161478 A1 | 6/2011 | Formo et al. | |
| 2011/0162038 A1 | 6/2011 | Chunilal | |
| 2011/0173397 A1 | 7/2011 | Boyle et al. | |
| 2011/0179161 A1 | 7/2011 | Guy et al. | |
| 2011/0219190 A1 | 9/2011 | Ng et al. | |
| 2011/0231489 A1 | 9/2011 | Rathod | |
| 2011/0238755 A1 | 9/2011 | Khan et al. | |
| 2011/0238766 A1* | 9/2011 | Lew et al. | 709/206 |
| 2011/0239282 A1 | 9/2011 | Svarfvar et al. | |
| 2011/0251898 A1* | 10/2011 | Scott et al. | 705/14.62 |
| 2011/0251970 A1 | 10/2011 | Oien et al. | |
| 2011/0270685 A1* | 11/2011 | Marks et al. | 705/14.66 |
| 2012/0054631 A1* | 3/2012 | Nurmi et al. | 715/744 |
| 2012/0072494 A1 | 3/2012 | Wong et al. | |
| 2012/0143973 A1 | 6/2012 | Nieuwerth | |
| 2012/0158715 A1 | 6/2012 | Maghoul et al. | |
| 2012/0173383 A1* | 7/2012 | Badawiyeh et al. | 705/26.7 |
| 2012/0184363 A1 | 7/2012 | Barclay et al. | |
| 2012/0202587 A1 | 8/2012 | Allen et al. | |
| 2012/0214564 A1 | 8/2012 | Barclay et al. | |
| 2012/0215538 A1 | 8/2012 | Cleasby et al. | |
| 2012/0221645 A1* | 8/2012 | Anthru et al. | 709/204 |
| 2012/0221962 A1 | 8/2012 | Lew et al. | |
| 2012/0226749 A1 | 9/2012 | Dale et al. | |
| 2012/0226759 A1 | 9/2012 | Lew et al. | |
| 2012/0227086 A1 | 9/2012 | Dale et al. | |
| 2012/0227087 A1 | 9/2012 | Brown et al. | |
| 2012/0246245 A1* | 9/2012 | Nilsson | 709/206 |
| 2012/0254902 A1 | 10/2012 | Brown et al. | |
| 2012/0254903 A1 | 10/2012 | Brown et al. | |
| 2012/0254904 A1 | 10/2012 | Brown et al. | |
| 2013/0006602 A1 | 1/2013 | Zhu et al. | |
| 2013/0024949 A1* | 1/2013 | Baldwin et al. | 726/28 |
| 2013/0091204 A1* | 4/2013 | Loh et al. | 709/204 |
| 2013/0326372 A1 | 12/2013 | Angell et al. | |
| 2014/0244761 A1 | 8/2014 | Dale et al. | |

OTHER PUBLICATIONS

"U.S. Appl. No. 13/077,411, Non Final Office Action dated Dec. 6, 2012", 20 pgs.

"U.S. Appl. No. 13/077,440, Non Final Office Action dated Apr. 29, 2013", 10 pgs.

"U.S. Appl. No. 13/190,281 , Response filed Apr. 9, 2013 to Non Final Office Action dated Nov. 9, 2012", 20 pgs.

"U.S. Appl. No. 13/190,281, Notice of Allowance dated May 10, 2013", 10 pgs.

"U.S. Appl. No. 13/244,878, Notice of Allowance dated Feb. 13, 2013", 5 pgs.

"U.S. Appl. No. 13/244,888 , Response filed Apr. 15, 2013 to Non Final Office Action dated Nov. 14, 2012", 15 pgs.

"U.S. Appl. No. 13/077,394, Examiner Interview Summary dated Feb. 8, 2012", 3 pgs.

"U.S. Appl. No. 13/077,394, Non Final Office Action dated Dec. 22, 2011", 16 pgs.

"U.S. Appl. No. 13/077,394, Notice of Allowance dated May 23, 2012", 7 pgs.

"U.S. Appl. No. 13/077,394, Response filed Mar. 22, 2012 to Non Final Office Action dated Dec. 22, 2011", 15 pgs.

"U.S. Appl. No. 13/077,466, Non Final Office Action dated Feb. 16, 2012", 6 pgs.

"U.S. Appl. No. 13/077,466, Notice of Allowance dated Aug. 8, 2012", 11 pgs.

"U.S. Appl. No. 13/077,466, Response filed May 16, 2012 to Office Action dated Feb. 16, 2012", 10 pgs.

"U.S. Appl. No. 13/077,466, Supplemental Amendment filed May 31, 2012", 10 pgs.

"U.S. Appl. No. 13/244,878, Non Final Office Action dated Jan. 30, 2012", 8 pgs.

"U.S. Appl. No. 13/244,878, Notice of Allowance dated May 11, 2012", 5 pgs.

"U.S. Appl. No. 13/244,878, Notice of Allowance dated Jul. 17, 2012", 5 pgs.

"U.S. Appl. No. 13/244,878, Preliminary Amendment filed Dec. 16, 2011", 3 pgs.

"U.S. Appl. No. 13/244,878, Response filed Apr. 30, 2012 to Non Final Office dated Jan. 30, 2012", 10 pgs.

"U.S. Appl. No. 13/244,885, Examiner Interview Summary dated Feb. 24, 2012", 1 pg.

"U.S. Appl. No. 13/244,885, Notice of Allowance dated Feb. 24, 2012", 13 pgs.

"U.S. Appl. No. 13/244,885, Preliminary Amendment filed Dec. 12, 2011", 3 pgs.

"U.S. Appl. No. 13/244,888, Examiner Interview Summary dated Apr. 9, 2012", 4 pgs.

"U.S. Appl. No. 13/244,888, Final Office Action dated Jul. 6, 2012", 10 pgs.

"U.S. Appl. No. 13/244,888, Non Final Office Action dated Feb. 29, 2012", 9 pgs.

"U.S. Appl. No. 13/244,888, Preliminary Amendment filed Dec. 12, 2011", 3 pgs.

(56) References Cited

OTHER PUBLICATIONS

"U.S. Appl. No. 13/244,888, Response filed Apr. 30, 2012 to Non Final Office Action dated Feb. 29, 2012", 11 pgs.
"U.S. Appl. No. 13/244,894, Examiner Interview Summary dated Mar. 5, 2012", 3 pgs.
"U.S. Appl. No. 13/244,894, Final Office Action dated Jul. 6, 2012", 20 pgs.
"U.S. Appl. No. 13/244,894, Non Final Office Action dated Dec. 9, 2011", 16 pgs.
"U.S. Appl. No. 13/244,894, Response filed Feb. 16, 2012 to Non Final Office Action dated Dec. 9, 2011", 13 pgs.
"U.S. Appl. No. 13/244,938 , Response filed Aug. 21, 2012 to Final Office Action dated May 21, 2012", 11 pgs.
"U.S. Appl. No. 13/244,938, Examiner Interview Summary dated Feb. 7, 2012", 3 pgs.
"U.S. Appl. No. 13/244,938, Final Office Action dated May 21, 2012", 17 pgs.
"U.S. Appl. No. 13/244,938, Non Final Office Action dated Dec. 22, 2011", 18 pgs.
"U.S. Appl. No. 13/244,938, Response filed Mar. 22, 2012 to Non Final Office Action dated Dec. 22, 2011", 15 pgs.
"U.S. Appl. No. 13/244,941 , Response filed Aug. 21, 2012 to Final Office Action dated May 21, 2012", 8 pgs.
"U.S. Appl. No. 13/244,941, Examiner Interview Summary dated Feb. 8, 2012", 3 pgs.
"U.S. Appl. No. 13/244,941, Final Office Action dated May 21, 2012", 12 pgs.
"U.S. Appl. No. 13/244,941, Non Final Office Action dated Dec. 21, 2011", 15 pgs.
"U.S. Appl. No. 13/244,941, Response filed Mar. 21, 2012 to Non Final Office Action dated Dec. 21, 2011", 12 pgs.
"U.S. Appl. No. 13/244,942, Examiner Interview Summary dated Feb. 7, 2012", 3 pgs.
"U.S. Appl. No. 13/244,942, Non Final Office Action dated Dec. 22, 2011", 18 pgs.
"U.S. Appl. No. 13/244,942, Notice of Allowance dated Jun. 4, 2012", 11 pgs.
"U.S. Appl. No. 13/244,942, Response filed Mar. 22, 2012 to Non Final Office Action dated Dec. 22, 2011", 14 pgs.
"Facebook Markup Language (FBML)", [Online]. Retrieved from the Internet: <URL:developers.facebook.com/docs/reference/fbml/ >, (Accessed Aug. 17, 2012).
"OpenSocial: Frequently Asked Questions", Google.com, 2011 [retrieved on Dec. 9, 2011]. Retrieved from <http://code.google.com/apis/opensocial/faq.html>, (Accessed Dec. 9, 2011), 2 pgs.
"Social network aggregation", Wikipedia.org, Nov. 11, 2011 [retrieved on Dec. 6, 2011]. Retrieved from <http://en.wikipedia.org/wiki/Social_network_aggregation>, (Accessed Dec. 6, 2011), 3 pgs.
"Socialstream", [Online]. Carnegie Mellon University HCII, 2006. [retrieved on Dec. 6, 2011]. Retrieved from < http://www.hcii.cmu.edu/M-HCI/2006/SocialstreamProject/socialstream.php>, (Accessed Dec. 6, 2011]), 2 pgs.
"SocialStream", Carnegie Mellon University HCII, [Online Video].. Retrieved from the Internet: <URL: http://www.hcii.cmu.edu/M-HCI/2006/SocialstreamProject/Socialstream_demo.mov >, (2006. Accessed Apr. 30, 2012), 5 minutes, 6 seconds; 29.0 MB.
"Socialstream Features", [Online]. Carnegie Mellon University HCII, 2006. [retrieved on Dec. 6, 2011]. Retrieved from Internet: < http://www.hcii.cmu.edu/M-HCI/2006/SocialstreamProject/features.php>, (Accessed Dec. 6, 2011), 3 pgs.
"Storage Media", Microsoft Computer Dictionary, Fifth Edition, Microsoft Press, (2002), p. 499.
"The OAuth 1.0 Protocol", E. Hammer-Lahav (ed.), Internet Engineering Task Force (IETF), Request for Comments: 5849, Category: Informational, ISSN: 2070-1721, (Apr. 2010), 38 pgs.
"The OAuth 2.0 Authorization Protocol", E. Hammer-Lahav et al. (eds.), draft-ietf-oauth-v2-13, Network Working Group, Obsoletes: 5849 (if approved), Intended status: Standards Track, (Feb. 16, 2011), 44 pgs.
"Vinehub Login", Vinehub, 2011, [Online]. Retrieved from the Internet: <URL: http://www.vinehub.com/index.php/login/>, (Accessed Aug. 22, 2012), 1 pg.
"Vinehub: Frequently Asked Questions", Vinehub, 2011, [Online]. Retrieved from the Internet: <URL: http://www.vinehub.com/index.php/pages/faq/>, (Accessed on Aug. 22, 2012), 1 pg.
"Web Application Toolkit for Social Network APIs", Microsoft, Jul. 15, 2010 [retrieved on Dec. 9, 2011]. Retrieved from <URL: http://archive.msdn.microsoft.com/watsocial, (Accessed Dec. 9, 2011), 2 pgs.
Brown, Nathan, "Social Network Application Programming Interface", U.S. Appl. No. 13/077,394, Application, filed Mar. 31, 2011, 51 pgs.
Brown, Nathan, "Social Network Application Programming Interface", U.S. Appl. No. 13/244,941, filed Sep. 26, 2011, 58 pgs.
Brown, Nathan, et al., "Social Network Application Programming Interface", U.S. Appl. No. 13/244,942, filed Sep. 26, 2011, 59 pgs.
Morin, Dave, "Announcing Facebook Connect", [online]. Facebook, May 9, 2008 [retrieved on Feb. 14, 2012]. Retrieved from < developers.facebook.com/blog/post/108/ >, (May 9, 2008), 2 pgs.
Mulligan, Catherine, "Open API Standardisation For The NGN Platform", Proceedings of the First ITU-T Kaleidoscope Academic Conference, (2008), 8 pgs.
Perez, Sarah, "Vinehub: New Social Network Connector to Aggregate, Update Multiple Services", ReadWriteWeb, May 20, 2010 [retrieved on Dec. 6, 2011]. Retrieved from <http://www.readwriteweb.com/archives/vinehub_new_social_network_connector_to_aggregate_update_multiple_services.php#.TuJLoUXQb3o.email>, (May 20, 2010), 3 pgs.
Schroeder, S., "20 Ways to Aggregate Your Social Networking Profiles", mashable.com, [Online]. Retrieved from the Internet: <URL: http://mashable.com/2007/07/17/social-network-aggregators/>, (Jul. 17, 2007), 8 pgs.
"U.S. Appl. No. 13/077,411, Final Office Action dated Aug. 27, 2013", 20 pgs.
"U.S. Appl. No. 13/077,411, Response filed Jan. 22, 2014 to Final Office Action dated Aug. 27, 2013", 17 pgs.
"U.S. Appl. No. 13/077,440, Examiner Interview Summary dated Oct. 28, 2013", 3 pgs.
"U.S. Appl. No. 13/077,440, Final Office Action dated Oct. 15, 2013", 5 pgs.
"U.S. Appl. No. 13/077,440, Notice of Allowance dated Nov. 26, 2013", 7 pgs.
"U.S. Appl. No. 13/077,440, Response filed Sep. 30, 2013 to Non Final Office Action dated Apr. 29, 2013", 9 pgs.
"U.S. Appl. No. 13/077,440, Response filed Nov. 8, 2013 to Final Office Action dated Oct. 15, 2013", 8 pgs.
"U.S. Appl. No. 13/244,888, Notice of Allowance dated Jul. 19, 2013", 15 pgs.
"U.S. Appl. No. 13/680,176, Non Final Office Action dated Sep. 12, 2013", 6 pgs.
"U.S. Appl. No. 13/680,176, Notice of Allowance dated Feb. 5, 2014", 10 pgs.
"U.S. Appl. No. 13/680,176, Response filed Jan. 13, 2014 to Non-Final Office Action dated Sep. 12, 2013", 8 pgs.
"U.S. Appl. No. 13/077,440, Notice of Allowance dated Mar. 17, 2014", 5 pgs.
"U.S. Appl. No. 13/244,894, Non Final Office Action dated Apr. 24, 2014", 24 pgs.
"U.S. Appl. No. 13/244,894, Response filed Aug. 20, 2014 to Non-Final Office Action dated Apr. 24, 2014", 14 pgs.
"U.S. Appl. No. 13/680,176, Preliminary Amendment dated Mar. 19, 2013", 4 pgs.
"U.S. Appl. No. 13/680,176, Preliminary Amendment dated Dec. 7, 2012", 7 pgs.
"U.S. Appl. No. 13/735,669, Non Final Office Action dated Apr. 30, 2014", 10 pgs.
"U.S. Appl. No. 13/735,669, Response filed Sep. 30, 2014 to Non-Final Office Action dated Apr. 30, 2014", 9 pgs.
"U.S. Appl. No. 14/272,123, Preliminary Amendment filed Aug. 5, 2014", 10 pgs.

(56) References Cited

OTHER PUBLICATIONS

"U.S. Appl. No. 13/077,411, Notice of Allowance dated Dec. 1, 2015", 14 pgs.

"U.S. Appl. No. 13/077,411, Response filed Nov. 9, 2015 to Final Office Action dated Jun. 8, 2015", 11 pgs.

"U.S. Appl. No. 13/077,411, Final Office Action dated Jun. 8, 2015", 8 pgs.

"U.S. Appl. No. 13/077,411, Non Final Office Action dated Jan. 7, 2015", 12 pgs.

"U.S. Appl. No. 13/077,411, Response filed Apr. 7, 2015 to Non Final Office Action dated Jan. 7, 2015", 12 pgs.

"U.S. Appl. No. 13/244,894, Notice of Allowance dated Dec. 8, 2014", 20 pgs.

"U.S. Appl. No. 13/735,669, Notice of Allowance dated Nov. 7, 2014", 7 pgs.

"U.S. Appl. No. 14/272,123, Non Final Office Action dated Mar. 3, 2015", 8 pgs.

"U.S. Appl. No. 14/272,123, Notice of Allowance dated Aug. 5, 2015", 5 pgs.

"U.S. Appl. No. 14/272,123, Response filed Jul. 2, 2015 to Non Final Office Action dated Mar. 3, 2015", 9 pgs.

"U.S. Appl. No. 13/077,394, Notice of Allowance dated Sep. 10, 2012", 7 pgs.

"U.S. Appl. No. 13/190,281, Examiner Interview Summary dated Aug. 29, 2012", 2 pgs.

"U.S. Appl. No. 13/190,281, Non Final Office Action dated Nov. 9, 2012", 34 pgs.

"U.S. Appl. No. 13/244,888, Non Final Office Action dated Nov. 14, 2012", 10 pgs.

"U.S. Appl. No. 13/244,888, Response dated Oct. 8, 2012 to Final Office Action dated Jul. 6, 2012", 11 pgs.

"U.S. Appl. No. 13/244,894, Response dated Oct. 9, 2012 to Final Office Action dated Jul. 6, 2012", 11 pgs.

"U.S. Appl. No. 13/244,938, Notice of Allowance dated Oct. 16, 2012", 7 pgs.

"U.S. Appl. No. 13/244,941, Notice of Allowance dated Oct. 16, 2012", 7 pgs.

"U.S. Appl. No. 13/244,942, Corrected Notice of Allowance dated Aug. 24, 2012", 4 pgs.

\* cited by examiner

CROSS PLATFORM SOCIAL NETWORKING MESSAGING SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc., 2011, All Rights Reserved.

BACKGROUND

A social networking service is an online service, platform or site that allows members to build or reflect social networks or social relations among members. Typically, members construct profiles, which can include personal information such as name, contact information, employment information, photographs, personal messages, status information, links to web related content, blogs, and so on. Typically, only a portion of a member's profile can be viewed by the general public, and/or other members.

The social networking site allows members to identify, and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation. If the second member accepts the invitation, the first and second members are connected.

In general, a connection or link may represent or may be otherwise associated with an information access privilege, such that a first person who has established a connection with a second person is, via the establishment of that connection, authorizing the second person to view or access non-publicly available portions of their profiles. Of course, depending on the particular implementation of the business/social networking service the nature and type of the information that may be shared as well as the granularity with which the access privileges may be defined to protect certain types of data can vary greatly.

A variety of different social networking services have gained popularity, include FACEBOOK® of Palo Alto, Calif., MYSPACE® of Beverly Hills, Calif. and run by News Corp., LINKEDIN® of Mountain View, Calif., TWITTER® of San Francisco, Calif., and the like. These sites often allow for third party applications to utilize certain functionality provided by the host social networking service. In some examples, these third party applications can utilize certain user interface (UI) elements of the social networking service, access personal information about a user including profile information, and send and post messages to a user's profile. FACEBOOK®, for example allows developers to create applications which are integrated into the FACEBOOK® user interface and with the FACEBOOK® social networking system. In some examples, these applications can include games such as CITYVILLE®, FARMVILLE®, and MAFIA WARS®, all developed by ZYNGA®, Inc. of San Francisco, Calif. These applications appear in a FACEBOOK® page, and make use of various features of FACEBOOK®, such as contacting friends to encourage them to join the game and play with the user, and the like.

The social networking services integrate with these applications by providing to these applications an Application Programming Interface or "API." In general, an Application Programming Interface (API) is a particular set of rules and specifications that a software program can follow to access and make use of the services and resources provided by another particular software program that implements that API. The API serves as an interface between different software programs and facilitates their interaction.

Figure 1:
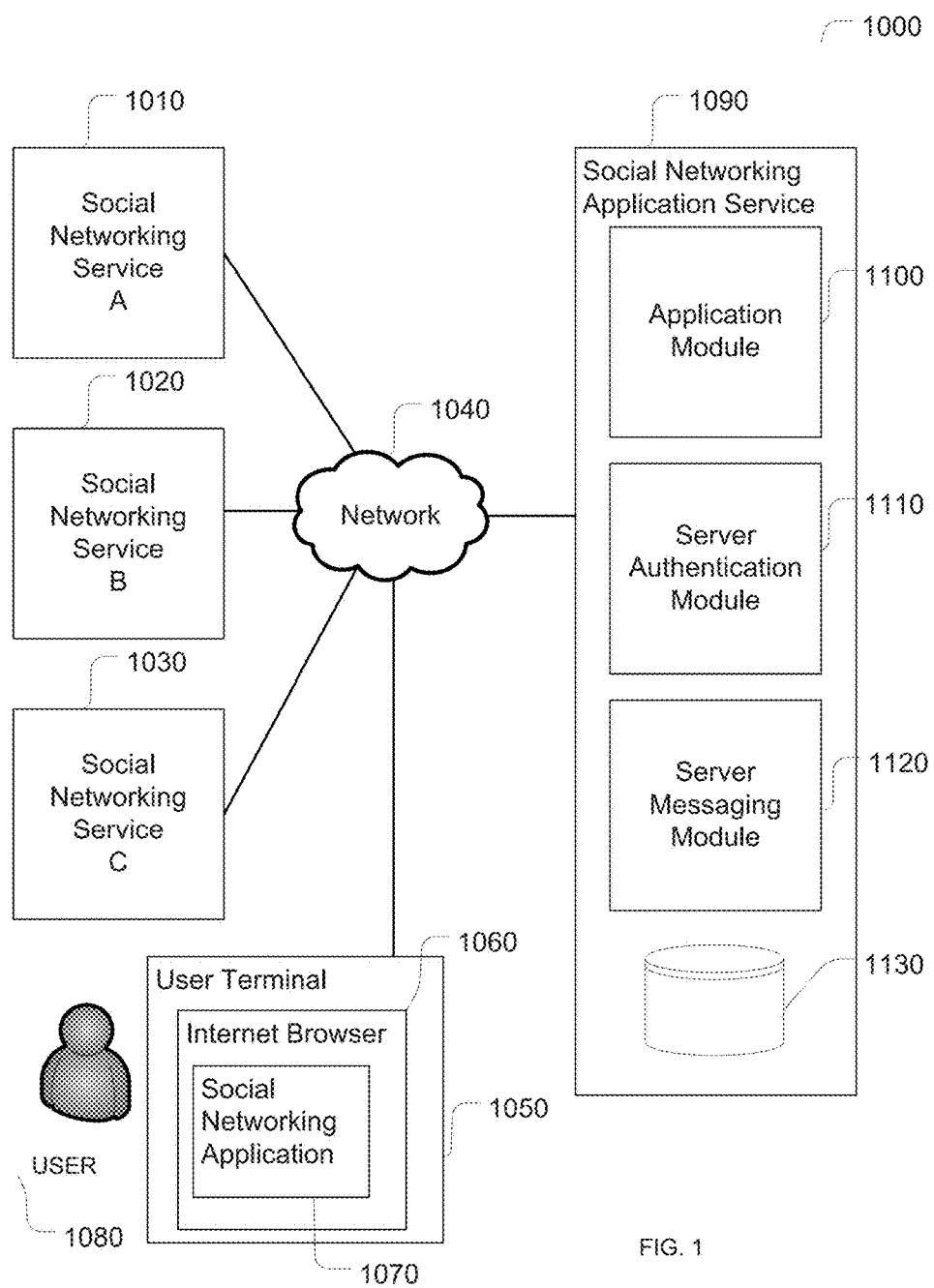
FIG. 1 is a block diagram illustrating social networking services, a network, a user terminal and a social networking application service according to one example of the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Many social networks provide various social interaction features. Some examples include portions of a user's profile on which the user or other members can post messages for the user or others to see. On FACEBOOK® this is called a user's "wall," and on MYSPACE® this is called a "comments" section. Other social interaction features can include a section which highlights information about other members to which the user has connections. Such information can include profile changes, upcoming events, birthdays, and the like. On FACEBOOK® this is called a "news feed." Other example social interaction features include photo albums, member blogging, virtual gifts, "moods" (a MYSPACE® feature in which small emoticons are used to depict a mood the user is in), the ability to post music files and playlists, bulletins (posts that are posted onto a "bulletin board" which is visible to all the user's connections), groups which share a common webpage and message board, instant messaging, and the like.

Social networking applications can utilize many of these features to enrich a user's application experience by involving or utilizing the user's connections. In some examples, applications can post messages to a users "wall" or to the "comments" section, post messages and activity reports on the "news feed" section, upload audio, video, and the like. These posts can include requests that a connection join the game and play with the user, update other users on in-game progress, offer rewards or virtual gifts, complete game tasks, and the like. These interactions can be posted to the profile of the user who is utilizing the application or to the profiles of users who are connected with that user.

These social interactions in some examples can be a one-to-many interaction: that is, one user sends or posts the message, so that many other members can see or receive this message. In other examples, this can be a one-to-one message: that is, one user sends this message, or posts the message, so that only one other member can see or receive the message. In yet other examples, these social interactions can be real-time—i.e., a chat feature. In some cases, applications can utilize provided APIs of the social networking service to use these social interactions to send other member's messages. These APIs can be referred to as "messaging APIs." These messages can appear to be from the user, or from the application.

Many users have accounts with multiple social networking services. The connections formed by a user on one social networking service of which that user is a member can differ from the connections formed on a different social networking service of which that user is a member. As a result, simply utilizing the messaging API calls of one social networking service will only reach a portion of a user's online connections. Disclosed is a system and method for multiplexing a social interaction across multiple disparate social networking systems. In some examples, a social networking independent API call is defined that takes as input a payload data structure and outputs API calls to a variety of social networking services to implement the interactions across multiple social networking services. While this disclosure may refer to messages and interactions interchangeably, a message can be one type of interaction and one skilled in the art with the benefit of the present disclosure will understand that the present disclosure is not limited to messages, but can also be applied to social networking interactions in general.

FIG. 1 shows one example system 1000. Typically, a user, such as user 1080, will access and communicate with one or more social networking services 1010-1030 through network 1040. Social networking services 1010-1030 in some examples may include FACEBOOK®, MYSPACE®, LINKEDIN®, TWITTER®, and the like. In some examples, this communication may be done through the user terminal 1050. User terminal 1050 in some examples may include a personal computer, laptop computer, tablet computer, smart phone or other cellular telephone, electronic book reader, or any other device that allows a user to access the functionality of the social networking service. In some examples, an internet browser 1060 of the user terminal 1050 is used to access the social networking services 1010-1030 using network 1040. Internet browser 1060 in some examples may include Internet Explorer® from Microsoft Corp., Redmond, Wash. Network 1040 may be any method by which user terminal 1050 may communicate with one or more social networking services 1010-1030. In some examples, network 1040 may include the internet, a WAN, LAN, cellular network, or any other method of allowing the user terminal 1050 to connect with the social networking service, and the like. While three social networking services are shown in FIG. 1 (1010-1030), it will be appreciated by those skilled in the art that the system and methods of the current disclosure are applicable to more or less than three social networks.

Typically, when a user 1080 accesses a third party application (such as a game) associated with one of the social networking services 1010-1030, the user 1080 selects the application via the social networking service 1010-1030, which then re-directs the user to download the application from another server. In some examples, this server may be located on a social networking application service 1090. The user's browser then displays or executes this application. In some examples, this social networking application 1070 may be or include HTML, JavaScript, Adobe Flash, Microsoft Silverlight, and the like. The social network 1010-1030 from which the user selected the content may be called the host social network. The user's browser then executes or displays this social networking application 1070 until the user 1080 decides to exit or the application closes or otherwise ends.

In some examples, while the application 1070 executes, it communicates with the host social networking service to which it is associated. Example communications include authenticating, authorizing, utilizing the user interface elements of the host social network, obtaining social network information about user 1080 such as connections with other users, sending messages to other users, and the like.

In some examples, social networking application 1070 may communicate with social networking application service 1090. Social networking application service 1090 may include various functions to assist social networking application 1070. In some examples, social networking application service 1090 may include application module 1100 which stores and delivers to user terminals (including user terminal 1050) social networking application 1070 from storage 1130. In other examples, application module 1100 may contain execution logic for social networking application 1070. Examples of this execution logic include responding to user actions and inputs; payment and purchasing information for purchasing the application or unlocking, accelerating, or making available various features in the application 1070; sending messages to and from various other users of the application; storing application data in data store 1130; providing various media files such as graphics, video, and sound files; and the like. While social networking application service is shown in FIG. 1 as one system, the components and the functionality of social networking application service 1090 could be distributed across multiple systems.

In some examples, social networking application service 1090 includes a server authentication module 1110 which works with client authentication module 2010 (FIG. 2) to authenticate or authorize social networking application 1070 with a variety of social networking services 1010-1030.

In some examples, social networking application service 1090 includes server messaging module 1120 which can work with client messaging module 2030 (FIG. 2) to utilize social interactions to users of social networking services 1010-1030. These components will be discussed in more detail later.

Figure 2:
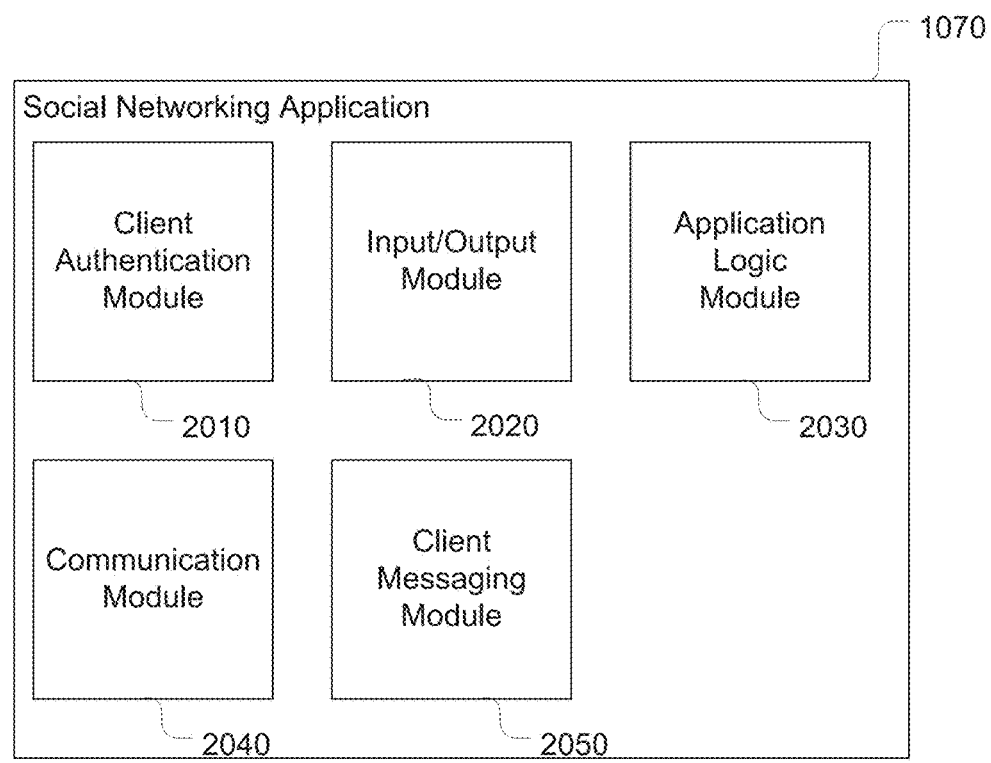
FIG. 2 is a block diagram illustrating a social networking application according to one example of the present disclosure.

One example social networking application 1070 is shown in FIG. 2. A social networking application 1070 is any application which utilizes, or is capable of utilizing, the API of one or more social networking services. In some examples social networking application 1070 may contain an input/output module 2020. Input/output module 2020 communicates with the user 1080, through user terminal 1050. Input/output module 2020 is responsible for causing the user interface of the social networking application 1070 to be displayed and for handling user inputs.

Application logic module 2030 in some examples is responsible for implementing the primary functions of the social networking application 1070. For example, in the case of a game, the game logic and the game rules are implemented by application logic module 2030. Application logic module 2030 in some examples communicates with application module 1100 using communication module 2040 to communicate changes in application state and user interactions, and to receive instructions for processing application events. In other examples, application logic module 2030 has all the logic necessary to process any application state changes and user interactions and to handle application events. In yet other examples application logic module 2030 has logic necessary for handling some application state changes, user interactions and application events while the remaining functionality is handled by application module 1100.

Communication module 2040 communicates with social networking service 1010-1030 and social networking application service 1090. In some examples, this communication may include network communication across network 1040. A variety of methods of communication may be used, including PHP, JavaScript, HTML, AJAX and the like.

Social networking application may include a client authentication module 2010 for managing authentication with one or more social networking services 1010-1030. Client authentication module 2010 works with server authentication module 1100 of social networking application service 1090 to perform authentication and authorization procedures with the various social networks 1010-1030. Authentication and authorization in some examples includes user authentication, which informs the social networking service and the application associated with the social networking service of the identity of the user; authorization, in which the user authorizes the social networking application 1070 to access certain personal information and take certain actions; application authentication, which allows the social networking service to verify that a trusted application is asking for access and to provide the requested level of access, and the like. In some examples, authentication and authorization with the social network are necessary to utilize the various APIs of the social networking services 1010-1030. In some examples, when a user launches social networking application 1070, client authentication module 2010 authenticates and authorizes the social networking application 1070 with the host social networking service. The host social networking service may then pass back authentication information. In some examples, this authentication information may be a token key that identifies a session. Client authentication module 2010 then passes this authentication information to server authentication module 1110 which stores this information for later use by other social networking applications, including other social networking applications that are hosted on different social networking services. In general, the authentication information may include any information necessary to utilize an application programming interface on a social networking service.

Server authentication module 1110 of social networking application service 1090 receives this authentication information. Server authentication module 1110 then stores this authentication information in data storage 1130. Server authentication module 1090 may then check data storage 1130 for any other authentication information relating to that user for other social networks 1010-1030 for the same or other applications. The authentication information in some cases may be related to a particular application available on multiple different social networks and in other cases may be application independent. If any other social networks have valid authentication information, server authentication module 1110 may then send that authentication information to client authentication module 2010 so that social networking application 1070 may utilize the API of other social networks.

Server authentication module 1110 is responsible for determining if user 1080 has active sessions on social networking services other than the social networking service that is associated with the currently running social networking application 1070. Because different social networks may have different user identification systems, in order to perform this association, server authentication module 1110 may use a variety of factors to associate the user 1080 of social networking application 1070 with authentication and authorization information previously stored in data storage 1130. Some factors include member id, name, social graphs (common friends), address, phone number, email address, TWITTER® account, website links, bank accounts, credit card information, and any other personal identifiable information. In yet other cases, the social networking application 1070 may prompt user 1080 to identify any other user accounts on other social networking services. Once an association is found, the server authentication module 1110 may store this association of user 1080 to the various social networking services for faster processing when looking up authentication information in the future.

For example, if user 1080 is named "John Smith," and his phone number is "555-555-5555," and he is a member of social networking service A 1010 with member id "1234" and social networking service B 1020 with member id "5678", upon launching a social networking application 1070 associated with social networking service A 1010, social networking application 1070 sends the authentication/authorization information to server authentication module 1110 along with identifying information for user 1080. Server authentication module 1110 has no record of any other sessions for user 1080 and does not pass back any sessions to social networking application 1070. Once user 1080 launches another social networking application on social networking service B, that also communicates with social networking application service 1090, the server authentication module 1110 determines based on items such as name, phone number, and other factors that user 1080 has member account "1234" on social networking service A 1010 and "5678" on social networking service B 1020. The association is saved for later use, and the previous session on social networking service A 1010 is sent to the calling social networking application.

Server messaging module 1120 and client messaging module 2050 in some examples can provide social networking application 1070 with messaging and social interaction functionality across all social networking services 1010-1030 in a social network agnostic context by providing to a social networking application 1070 a social networking service agnostic API interface and by translating calls made by the social networking application 1070 via that API interface into individual API calls of the various social networking services 1010-1030 in order to publish the desired messages and interactions.

Figure 3:
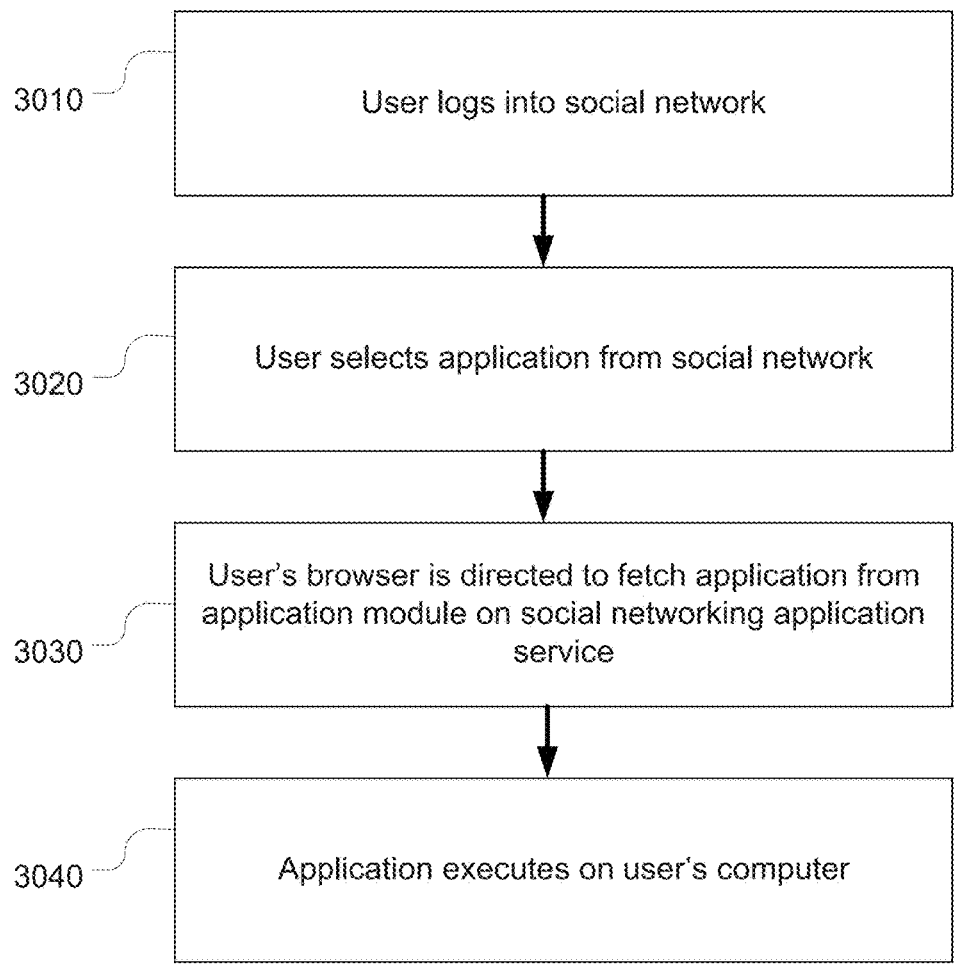
FIG. 3 is a flow chart illustrating a method to launch a social networking application according to one example of the present disclosure.

FIG. 3 shows one example method of the present disclosure. At 3010 a user logs onto a social network 1010-1030. Usually, this requires the user to enter certain identification and authentication information. In some examples this may be a username and a password. At step 3020 the user selects an application from the social network. In some examples, the application may be a game, productivity application such as a word processor, spreadsheet, messaging application, marketplace application, media application, dating application, and any other application that may be associated with a social networking service. In other examples, the user may visit social networking application service 1090, which then may prompt the user 1080 to login to one of the social networking services 1010-1030 through the use of certain authentication and authorization APIs provided by social networking services 1010-1030.

At step 3030, the user's browser is directed to fetch or download an application from an application module 1100 on a social networking application service 1090 by the social networking service. In some examples, the application is displayed in an IFRAME HTML element. In step 3040, the application executes on a user's computer or terminal 1050.

Figure 4:
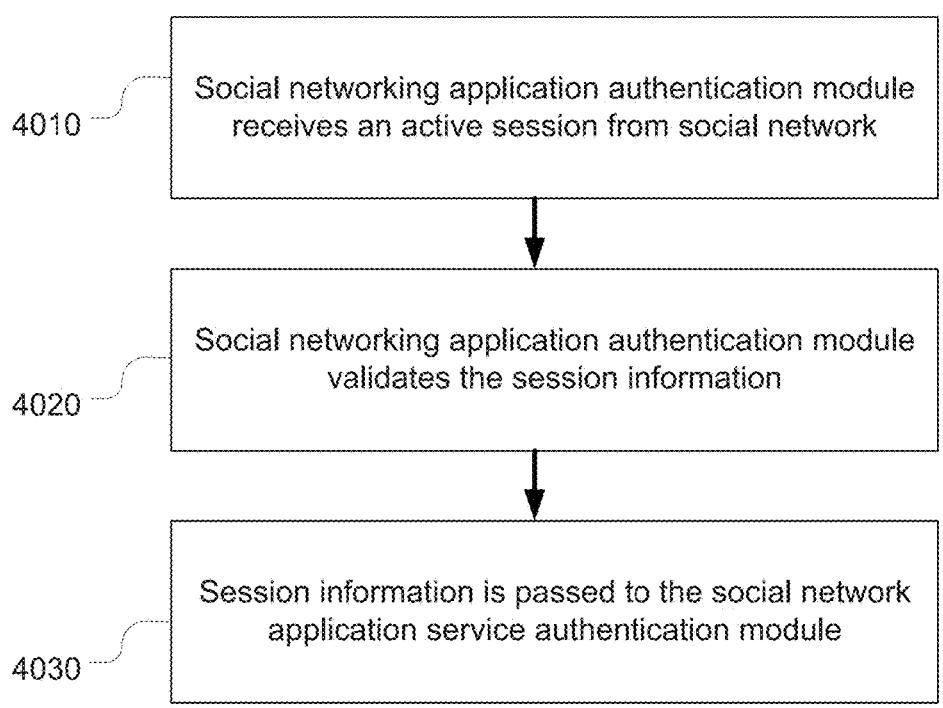
FIG. 4 is a flow chart illustrating a method of sending authentication information to the social networking application service according to one example of the present disclosure.

Turning now to FIG. 4, the social networking application client authentication module 2010 authenticates and authorizes with the host social networking service, receiving authentication information in return at 4010.

In some examples, this social networking application client authentication module 2010 validates the session information at 4020 by ensuring that the authentication information has not expired and is correctly formed. The authentication information may then be passed to the social network application service server authentication module 1110 at 4030 in order to store the session information and to signal social networking application service server authentication module 1110 to send to the social networking application client authentication module 2010 the authentication information of other social networks in order to allow API calls to other social networks.

Figure 5:
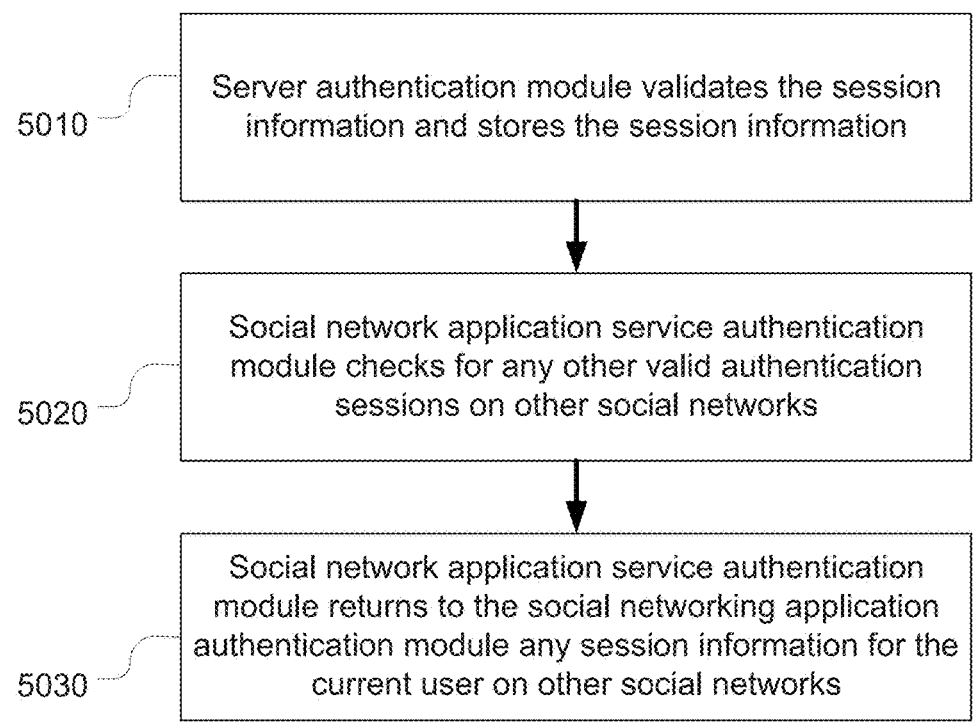
FIG. 5 is a flow chart illustrating a method for receiving authentication information at a social networking application service according to one example of the present disclosure.

FIG. 5 shows one example server authentication module method. At 5010, the server authentication module 1110 validates the authentication information sent by client authentication module 2010. This validation process in some examples is the same or similar to that of client authentication module 2010. Server authentication module 1110 then stores the authentication information in data store 1130. Server authentication module 1110 then checks for any other valid authentication information for other social networks at 5020. If any are found, the server authentication module 1110 may send information regarding that authentication information to client authentication module at 5030 so the client authentication module 5030 may utilize the API of those social networking services.

Figure 6:
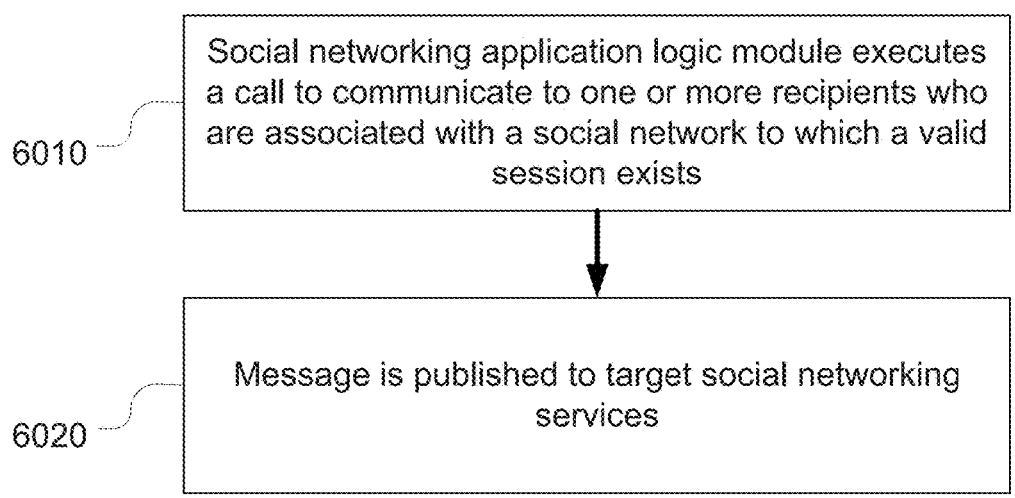
FIG. 6 is a flow chart illustrating one example method of utilizing social networking interactions according to one example of the present disclosure.

Turning now to FIG. 6, once social networking application 1070 desires to send a social interaction, either on behalf of user 1080 or on behalf of itself, it executes a call to client messaging module 2050 using a social network agnostic API call and passing in a social network agnostic payload data structure at operation 6010. Client messaging module can then either publish the social interaction itself by utilizing the APIs of the target social networking service 1010-1030, or it can pass the call to server messaging module 1120 which can publish the social interaction by utilizing the APIs of the target social networking service 1010-1030 at operation 6020. An interaction is published when the API of one of the social networking services 1010-1030 is invoked to signal the social networking service that an interaction is desired.

The target social networking services are the social networking services 1010-1030 to which the social interaction is targeted. The target users are the recipients of the social networking interaction. The recipients are determined by the social networking application 1070 or the user 1080 and in some examples can be a function of the type of social interaction. For example, a one-to-one message will have one recipient member. A one-to-many message will have many recipient members. The recipients can include a particular and specific member, or a group or class of members. In some examples the recipients can be the connections of the user 1080, or a subset of the connections of user 1080.

Because the recipients may be on multiple social networking services 1010-1030, and because of the many different types of interactions available, selecting the target social networking service may not be as straightforward as just utilizing all the various APIs of the social networking services to which the various recipients are members (although in some examples, this may be done). Target social networking services can be selected based upon a number of factors. Some example targets may include social networking services selected by social networking application 1070, the host social networking service only, all social networking services to which the user 1080 has valid authentication information stored at social networking application service 1090, all social networking services to which the user 1080 has valid authentication information and to which the target of the message is known to be a member (determined in some examples by using social networking application service 1090 to poll social networking services 1010-1030), or some combination or subsets of the above. In some examples, the target social networking services can vary depending on the type of social interaction and the target user of the social interaction. For example, in a one-to-many interaction, the social interaction may be sent to the lowest common denominator social networks—i.e. those of which ALL targets of the message are members in order that the message is delivered on social networks to which all of the targets are members. In other examples the social interaction may be sent to all social networks to which any target is a member. In still other examples, one factor includes social networking service capabilities. The social networking application may chose to send the social interactions to social networks that support a certain type of social interaction. Thus for example social networking application 1090 may not send the social interaction to a particular social networking service if that service does not support images and texts in the interaction. In other examples, the factors can include whether or not an interaction was already sent to this user on a different social network. This can be used to control unwanted or overly saturated social interactions.

Some other examples include social networking service performance (lower performing social networks may tie up too many resources), social networking service terms of use policies, the number of other social interactions the user 1080 has sent through this social networking service (certain social networks limit the number of messages that may be sent by a user through an application in specific time period), a user's past receptivity to these social interactions (users who rarely respond may be targeted on more social networks), and the like.

Figure 7:
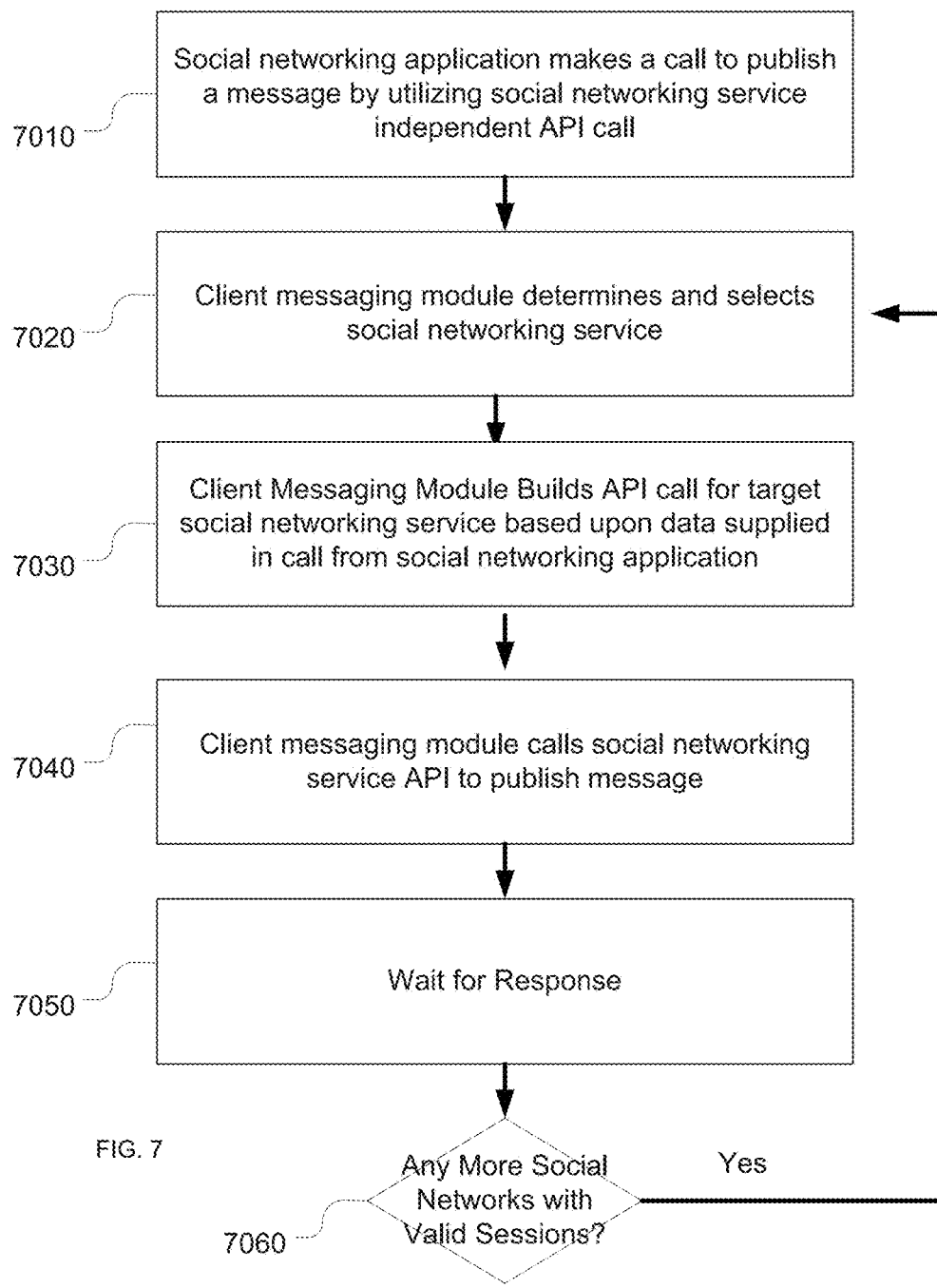
FIG. 7 is a flow chart illustrating one example method of utilizing social networking interactions according to one example of the present disclosure.

Turning now to FIG. 7, an example interaction publication method 6020 is shown. The social networking service independent API call is received at 7010. At 7020 the client messaging module 2050 determines the target social networking services and selects one of them. At 7030 the client messaging module 2050 builds an API call for the target social networking service based upon the data passed in with the publishing call 7010. In some examples, the social networking API call received in operation 7010 contains a parameter indicating the type of social interaction to utilize. The client messaging module 2050 can use this to construct the proper API call, along with the other parameter information. In some examples, the information passed in may have superfluous parameters and features such as images, links, and the like to which the target social networking service 1010-1030 cannot display. These extraneous parameters can be ignored in some examples, but in other examples, the messaging module can return a notification to the social networking application that some of the data sent with the API call cannot be used.

At operation 7040, the client messaging module 2050 calls the social networking service API to publish the message. This can be PHP, AJAX, HTML, XML, JavaScript, or any other method of submitting an API call to a social networking service. In some examples, client messaging module 2050 utilizes client authentication module 2010 to obtain authentication information for the various social networking service 1010-1030 that are the target of these requests. In some examples, client messaging module 2050 can utilize communication module 2040 to utilize these APIs.

In some examples, at 7050 the system waits for a response from the target social networking service. In yet other examples, the client messaging module 2050 can be multi-threaded, or event driven, and such the client messaging module 2050 may not block waiting for a response. At operation 7060, the client messaging module 2050 can check to see if any other social networking services are target social networking services at 7060. If there are other target social networking services, then operations 7020-7060 may be repeated.

Figure 8:
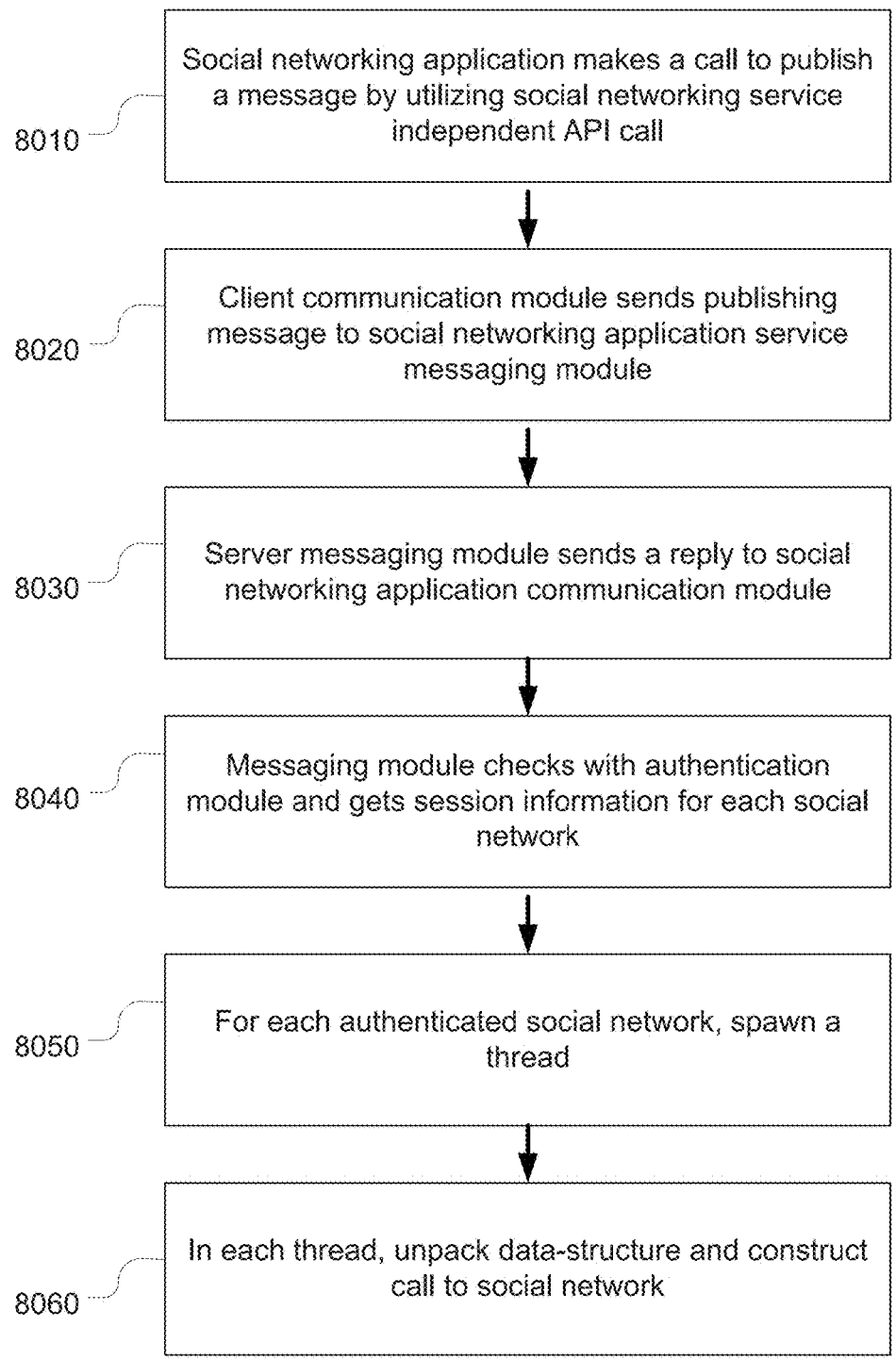
FIG. 8 is a flow chart illustrating one example method of utilizing social networking interactions according to one example of the present disclosure.

FIG. 8 shows another example message publication method. In operation 8010, the social networking application 1070 makes a call to publish a message or other social interaction by utilizing the social networking service independent API call. At operation 8020, the client messaging module 2050 forwards the publication message or other social interaction to the social networking application service messaging module 1120.

In some examples, the server messaging module 1120 sends a reply to the social networking application client messaging module 2040 immediately, which may then immediately reply to the social networking application 1070 at 8030. In other examples, the replies may be sent later after one or more of the target social networking services 1010-1030 have replied.

At operation 8040, the server messaging module 1120 retrieves any necessary authentication information from the authentication module 1110. In some examples, authentication information may be necessary to utilize the APIs on one or more of the target social networking services 1010-1030. In some examples, if the authentication information is not found, an error message can be sent back to client messaging module 2040 to indicate that some or all of the messages or interactions could not be utilized. In other examples, it may be possible to utilize other user's authentication information stored at social networking application service 1090 for social networks 1010-1030 other than user 1080 to utilize the social interactions.

In some examples, server authentication module may spawn a separate thread to handle constructing and implementing the API call for each target social networking service at operation 8050. In yet other examples, a blocking method may be used which iterates over the target social networking services generating and then implementing the various API calls and then waiting for a return. In yet other examples, an event driven system is utilized where event handlers wait for and process replies from the target social networking services 1010-1030.

At 8060, in each thread, the server messaging module 1120 can unpack the information sent from client messaging module 2050 and can construct the appropriate API call to the target social networking service and implements the call to utilize the social interaction.

Figure 9:
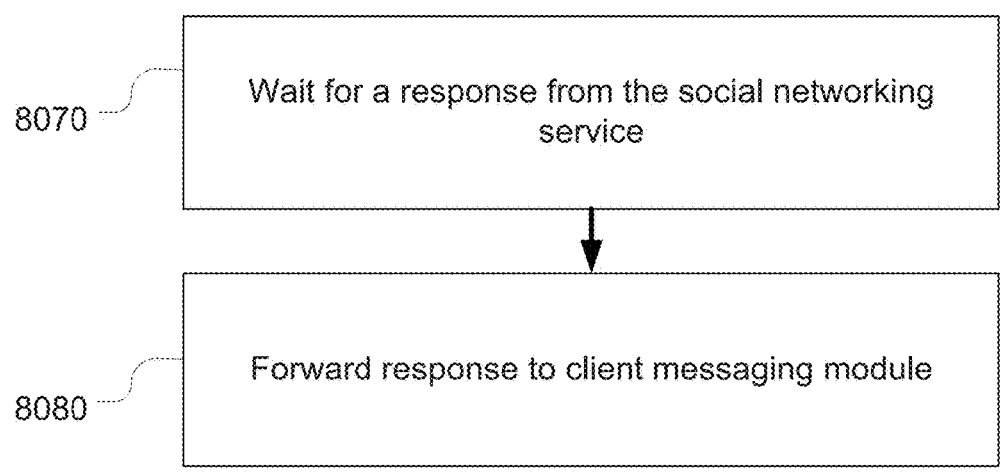
FIG. 9 is a flow chart illustrating one example method of handling responses according to one example of the present disclosure.

Turning now to FIG. 9, at operation 8070, the thread waits for a reply from the social networking service 1010-1030, and then at operation 8080 the thread forwards the reply back to the client messaging module 2050. In other examples, the threads do not wait for a reply, and instead, the server messaging module 1120 is an event driven module that handles the replies as they come in.

Some social networking services 1010-1030 allow for different content and format for their interactions then other social networking services 1010-1030. For example, one social networking service may allow putting video in an interaction, whereas another may not. In other examples, even similar fields may be formatted differently. For example, TWITTER® only allows 140 character messages, whereas FACEBOOK® allows more to be posted. The allowed content and format of a social interaction in some examples can be called the social interaction media capabilities. Because of these differences in capabilities, the system can utilize a basic set of information to publish the interactions on social networking services 1010-1030 that have more limited capabilities, and utilize a set of advanced information to publish the interactions on social networking services 1010-1030 that have more advanced capabilities. To accomplish this, the social networking application service 1090, or client messaging module 2050 may have a list of social networking application service 1010-1030 social interaction media capabilities that can be used when constructing the APIs to choose which set of information to include with the API call. Additionally, a special data structure may be used to describe the various forms and formats of the media to be used.

Figure 10:
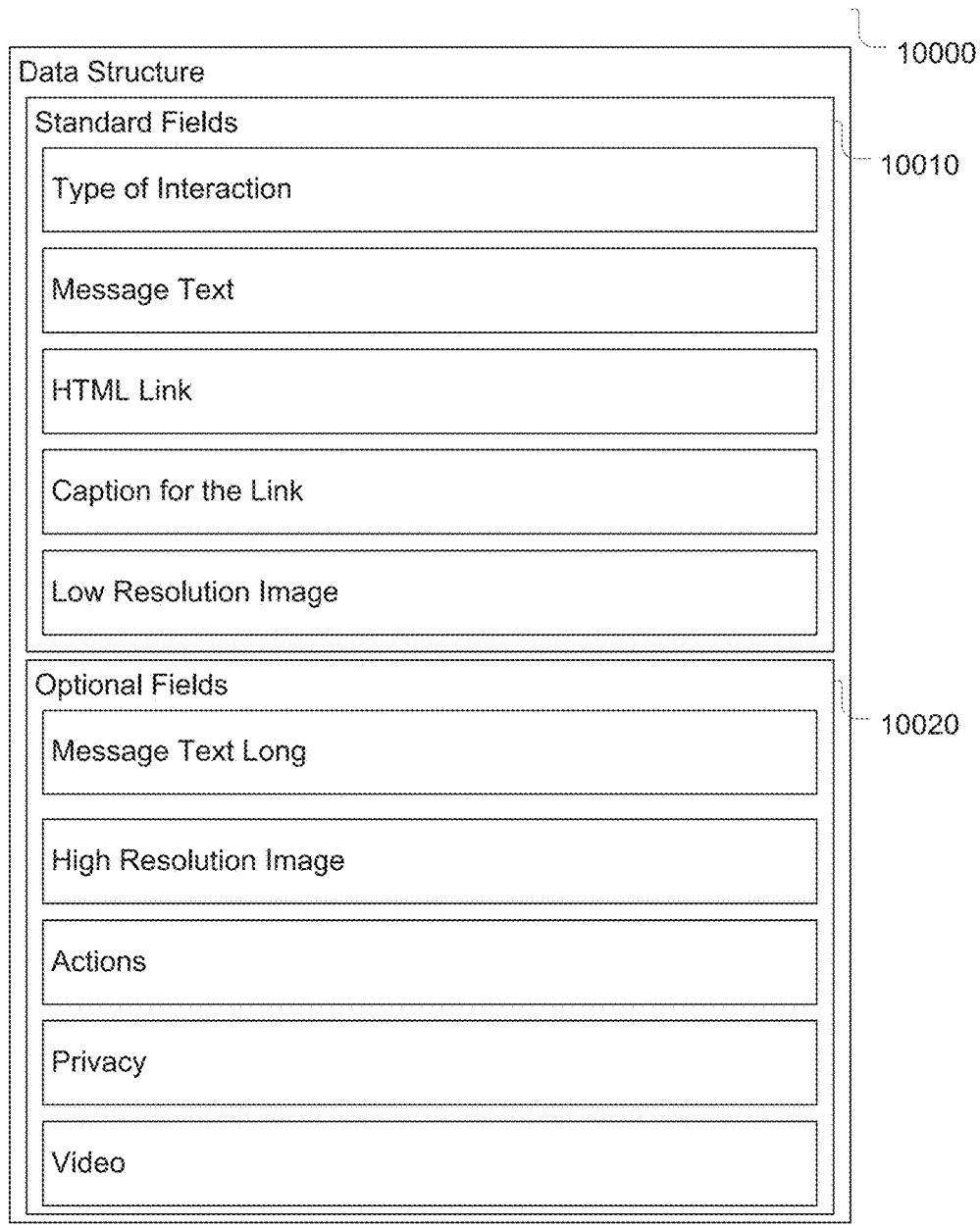
FIG. 10 is a schematic illustrating one example data structure according to one example of the present disclosure.
Figure 11:
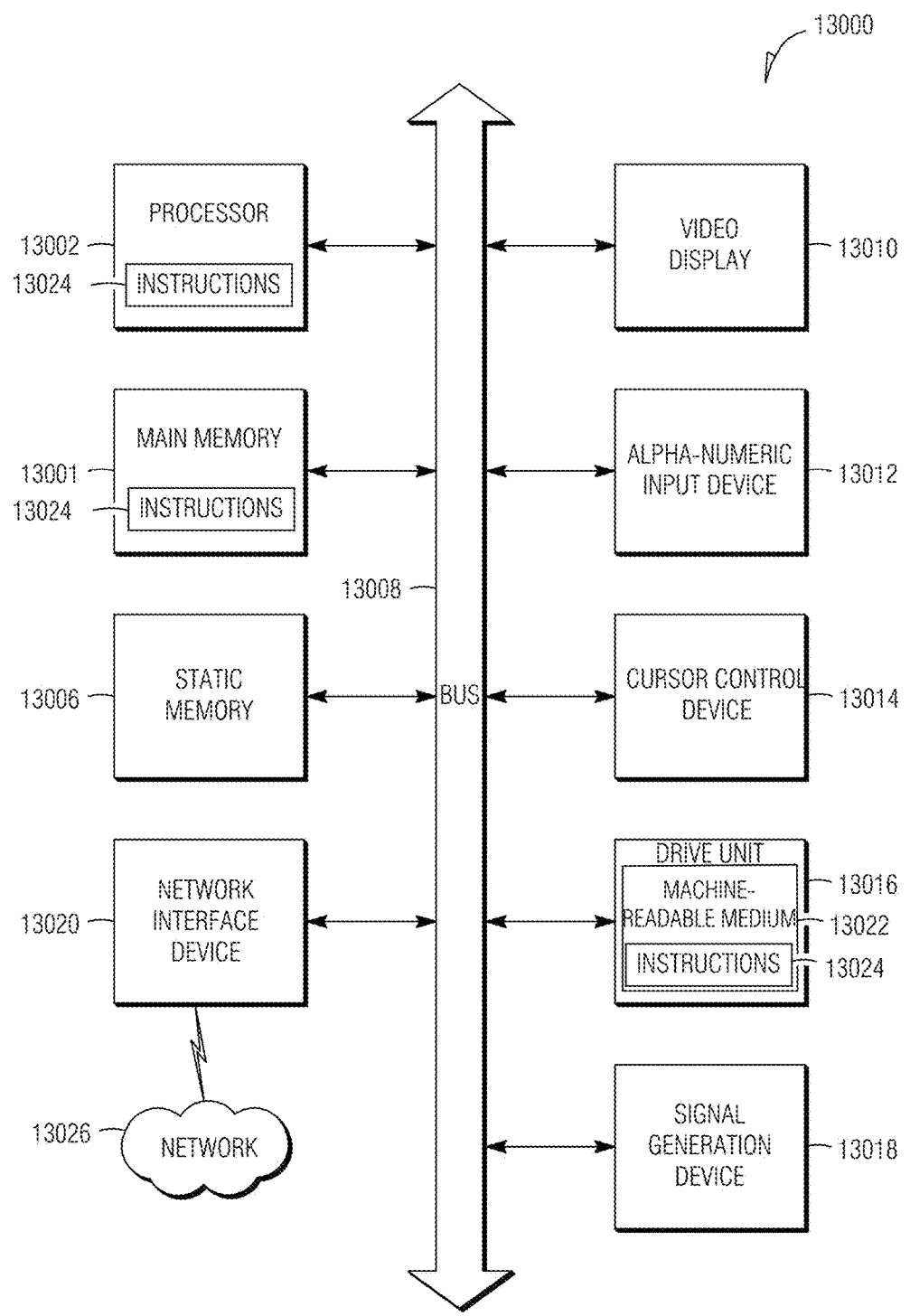
FIG. 11 is a schematic illustrating an example machine architecture according to one example of the present disclosure.

Turning now to FIG. 10, an example data structure that may be utilized by a social networking application 1070 in the call to client messaging module 2050, as well as in some examples, used in the client messaging module 2050 call to server messaging module 1120 is shown. 10010 shows a standard fields section. The standard fields section in some examples can include the information necessary to utilize a social interaction such as posting a message to a user's wall.

Some example standard fields can include an indicator of the type of interaction (such as message post, chat, and the like), a message text, an html link to include with the message, a caption for the link, a low resolution image to include with the message, and the like. In some examples the standard fields can be the same for all interactions, but in other examples, the standard fields can be specific to each individual interaction type. In some examples, these standard fields can be the lowest common denominator for all the social networking services supported such that compatibility can be maintained across all supported social networking services. For example, if social networking service A requires three fields—message text, html link and low resolution image, but social networking service B also requires a caption, the required fields can include all four elements. When the API call for social networking service A is generated, the extra field may be ignored. In other examples, the extra required field may not be included in the standard fields, but may be included in the optional fields 10020.

In other examples, different social networking services may have similar fields that may have differing limitations. For example, one social networking service may not support messages longer than a certain size, while others may accept longer messages. Thus in some examples, the message text in the standard fields may only be as long as the shortest message length supported by the social networking services 1010-1030. In other examples, longer messages are supported and supplied in the optional fields section 10020. When the APIs are constructed, the client messaging module 2050 or server messaging module 1120 can use either the standard field or the optional field 10020 depending on the capabilities of the social networking service. In other examples, both the standard and option fields can be concatenated together to form the larger message for use in social networking services that support such larger messages.

FIG. 10 also shows in some examples, a series of optional fields 10020. Optional fields 10020 in some examples can include additional media or options that are not supported by all social networking services 1010-1030. Some example optional fields can include longer message text, a high resolution image or a link to a high resolution image, a series of actions that may be enabled such as commenting, liking, and other options, privacy settings to enable or disable certain groups or users from viewing the interaction, and video, or a link to video or other media and any other optional additional media content.

Other Notes and Examples

Disclosed in one example is a method of cross-social network communication. The method may include determining a plurality of recipients of a social networking service interaction, determining a plurality of target social networking services based upon the plurality of recipients of the social networking service interaction, and a plurality of authentication information associated with the plurality of social networking services. For each of the plurality of target social networking services, an application programming interface call associated with the social networking service interaction may be constructed, the application programming interface call specifying at least one of the plurality of recipients that is to receive the interaction, the at least one of the plurality of recipients being members of the particular target social networking service.

Disclosed in one example is a system of cross-social network communication. The system may include a messaging module configured to determine a plurality of recipients of a social networking service interaction, determine a plurality of target social networking services based upon the plurality of recipients of the social networking service interaction, and a plurality of authentication information associated with the plurality of target social networking services; for each of the plurality of target social networking services, construct an application programming interface call associated with the social networking service interaction, the application programming interface call specifying at least one of the plurality of recipients that is to receive the interaction, the at least one of the plurality of recipients being members of the particular target social networking service, the messaging module being implemented by at least one processor.

Disclosed in another example is a machine readable medium that stores instructions which when executed by a machine, causes the machine to perform certain operations. The operations may include determining a plurality of recipients of a social networking service interaction, determining a plurality of target social networking services based upon the plurality of recipients of the social networking service interaction, and a plurality of authentication information associated with the plurality of social networking services, constructing an application programming interface call for each of the plurality of target social networking services, the application programming interface call associated with the social networking service interaction, the application programming interface call specifying at least one of the plurality of recipients that is to receive the interaction, the at least one of the plurality of recipients being members of the particular target social networking service.

These examples can be combined in any permutation or combination. This overview is intended to provide an overview of subject matter of the present patent application. It is not intended to provide an exclusive or exhaustive explanation of the invention. The detailed description is included to provide further information about the present patent application.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

FIG. 13 shows a diagrammatic representation of a machine in the example form of a computer system 13000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 13000 includes a processor 13002 (e.g., a Central Processing Unit (CPU), a Graphics Processing Unit (GPU) or both), a main memory 13001 and a static memory 13006, which communicate with each other via a bus 13008. The computer system 13000 may further include a video display unit 13010 (e.g., a Liquid Crystal Display (LCD) or a Cathode Ray Tube (CRT)). The computer system 13000 also includes an alphanumeric input device 13012 (e.g., a keyboard), a User Interface (UI) cursor controller 13014 (e.g., a mouse), a disk drive unit 13016, a signal generation device 13018 (e.g., a speaker) and a network interface device 13020 (e.g., a transmitter).

The disk drive unit 13016 includes a machine-readable medium 13022 on which is stored one or more sets of instructions 13024 and data structures (e.g., software) embodying or used by any one or more of the methodologies or functions illustrated herein. The software may also reside, completely or at least partially, within the main memory 13001 and/or within the processor 13002 during execution thereof by the computer system 13000, the main memory 13001 and the processor 13002 also constituting machine-readable media.

The instructions 13024 may further be transmitted or received over a network 13026 via the network interface device 13020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method of cross-social network communication comprising:
   using one or more computer processors to perform operations of:
      receiving, over a network, an indication to send a social networking service interaction which includes a first message;
      determining a first and a second recipient of the social networking service interaction;
      determining a first target social networking service, the first recipient being a member of the first target social networking service;
      determining a second target social networking service, the second recipient being a member of the second target social networking service;
      accessing first authentication information that was received over the network from a first social networking application corresponding to the first target social networking service and that indicates that the first social networking application has authenticated with the first target social networking service;
      accessing second authentication information that was received over the network from a second social networking application corresponding to the second target social networking service and that indicates that the second social networking application has authenticated with the second target social networking service;
      constructing a first application programming interface call according to a format for the first target social networking service and including the first message;
      constructing a second application programming interface call according to a format for the second target social networking service and including the first message;
      sending the first application programming interface call using the first authentication information; and
      sending the second application programming interface call using the second authentication information.

2. The method of claim 1, wherein the first and second target social networking services have different social interaction media capabilities, the social interaction media requirements specifying allowed social interaction content.

3. The method of claim 2, wherein the different social interaction media capabilities comprises accepting different text length inputs.

4. The method of claim 2, wherein the different social interaction media capabilities comprises the first target social networking service accepting video, and the second target social networking service not accepting video.

5. The method of claim 2, wherein constructing the first application programming interface call comprises:
   determining the social interaction media capabilities of the first target social networking service;
   determining that an item of content in the first message is not supported by the social interaction media capabilities of the first target social networking service; and
   responsive to determining that the item of content is not supported, omitting the item of content.

6. The method of claim 1, wherein determining the first recipient comprises determining a connection of a user on the first target social networking service and wherein determining the second recipient comprises determining a connection of the user on the second target social networking service.

7. The method of claim 1, wherein determining the first and second recipients is based upon past social interactions between a user and the first and second recipients.

8. The method of claim 1, wherein the first and second application programming interface calls are requests to publish the first message to an online profile of the first recipient on the first target social networking service and an online profile of second recipient on the second target social networking service.

9. A system of cross-social network communication comprising:
   a messaging module configured to operate with one or more computer processors to:
      receive, over a network, an indication to send a social networking service interaction which includes a first message;
      determine a first and a second recipient of the social networking service interaction;
      determine a first target social networking service, the first recipient being a member of the first target social networking service;
      determining a second target social networking service, the second recipient being a member of the second target social networking service;
      access first authentication information that was received over the network from a first social networking application corresponding to the first target social networking service and that indicates that the first social networking application has authenticated with the first target social networking service;
      access second authentication information that was received over the network from a second social networking application corresponding to the second target social networking service and that indicates that the second social networking application has authenticated with the second target social networking service;
construct a first application programming interface call according to a format for the first target social networking service and including the first message;
construct a second application programming interface call according to a format for the second target social networking service and including the first message;
send the first application programming interface call using the first authentication information; and
send the second application programming interface call using the second authentication information.

10. The system of claim 9, wherein the first and second target social networking services have different social interaction media requirements.

11. The system of claim 10, wherein the different social interaction media requirements comprises accepting different text length inputs.

12. The system of claim 10, wherein the different social interaction media requirements comprises the first target social networking service accepting video, and the second target social networking service not accepting video.

13. The system of claim 10, wherein the messaging module is configured to construct the first application programming interface call by:
determining the social interaction media capabilities of the first target social networking service;
determine that an item of content in the first message is not supported by the social interaction media capabilities of the first target social networking service; and
omit the item of content responsive to determining that the item of content is not supported.

14. The system of claim 9, wherein the messaging module is configured to determine the first recipient by at least being configured to determine a connection of a user on the first target social networking service and wherein the messaging module is configured to determine the second recipient by at least being configured to determine a connection of the user on the second target social networking service.

15. The system of claim 9, wherein the messaging module is configured to determine the first and second recipient by being configured to determine the first and second recipient based upon past social interactions between a user and the first and second recipients.

16. The system of claim 9, wherein the first message is a request for payment from the first and second recipients.

17. A non-transitory machine readable medium that stores instructions which when executed by a machine, causes the machine to perform operations comprising:
receiving, over a network, an indication to send a social networking service interaction which includes a first message;
determining a first and second recipient of the social networking service interaction;
determining a first target social networking service, the first recipient a member of the first target social networking service;
determining a second target social networking service, the second recipient a member of the second target social networking service;
accessing first authentication information that was received over the network from a first social networking application corresponding to the first target social networking service and that indicates that the first social networking application has authenticated with the first target social networking service;
accessing second authentication information that was received over the network from a second social networking application corresponding to the second target social networking service and that indicates that the second social networking application has authenticated with the second target social networking service;
constructing a first application programming interface call according to a format for the first target social networking service and including the first message;
constructing a second application programming interface call according to a format for the second target social networking service and including the first message;
sending the first application programming interface call using the first authentication information; and
sending the second application programming interface call using the second authentication information.

18. The machine readable medium of claim 17, wherein first and second target social networking services have different social interaction media requirements.

19. The machine readable medium of claim 18, wherein the different social interaction media requirements comprises accepting different text length inputs.

20. The machine readable medium of claim 18, wherein the different social interaction media requirements comprises the first target social networking service accepting video, and the second target social networking service not accepting video.

* * * * *

UNITED STATES PATENT AND TRADEMARK OFFICE
CERTIFICATE OF CORRECTION

PATENT NO. : 10,135,776 B1
APPLICATION NO. : 13/077425
DATED : November 20, 2018
INVENTOR(S) : Brown et al.

Page 1 of 1

It is certified that error appears in the above-identified patent and that said Letters Patent is hereby corrected as shown below:

In the Specification

Column 5, Line 5, delete "2030" and insert --2050-- therefor

Column 5, Line 46, delete "1100" and insert --1110-- therefor

Column 6, Line 14, delete "1090" and insert --1110-- therefor

Column 7, Line 66, delete "5030" and insert --2010-- therefor

Column 8, Line 61, delete "1090" and insert --1070-- therefor

Column 9, Lines 59-60, after "service", insert --server--

Column 9, Line 63, delete "2040" and insert --2050-- therefor

Column 10, Line 8, delete "2040" and insert --2050-- therefor

Signed and Sealed this
Fourth Day of January, 2022

Drew Hirshfeld
*Performing the Functions and Duties of the
Under Secretary of Commerce for Intellectual Property and
Director of the United States Patent and Trademark Office*